E. M. BOYNTON.
SAW.

No. 73,226.  PATENTED JAN. 14, 1868.

WITNESSES.  INVENTOR.

(Signatures copied from specification.)

United States Patent Office.

EBEN MOODY BOYNTON, OF GRAND RAPIDS, MICHIGAN.

Letters Patent No. 73,226, dated January 14, 1868.

IMPROVEMENT IN SAWS.

The Schedule referred to in these Letters Patent and making part of the same.

TO ALL WHOM IT MAY CONCERN:

Be it known that I, EBEN MOODY BOYNTON, of Grand Rapids, in the county of Kent, and State of Michigan, have invented certain new and useful Improvements in the Construction of Saws; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel manner of constructing the teeth of saws, whereby a portion of them shall perform the cutting, while others shall clear away the saw-dust, and gauge the depth of the cut of the teeth, this invention being an improvement upon the saw patented to A. Boynton, November 27, 1866, assigned and reissued to me, July 23, 1867.

Figure 1:
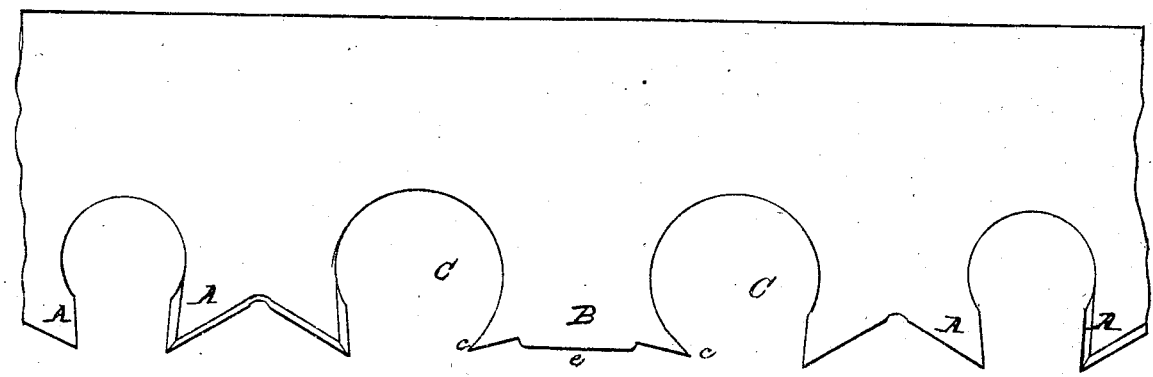

Figure 1 is a side view of a cross-cut saw made on my improved plan.

Figure 2:
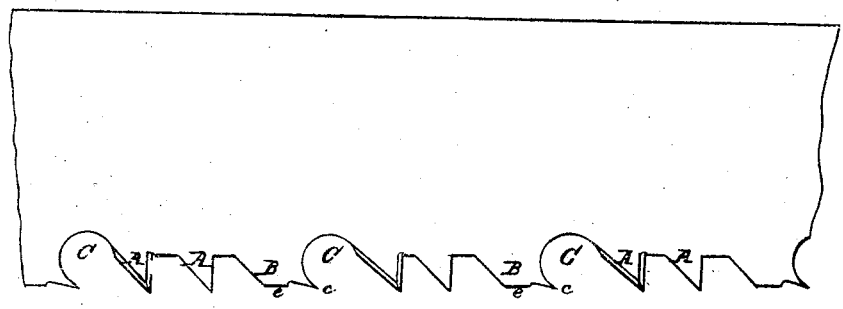

Figure 2, a similar view of saw for cutting in one direction only, formed on the same plan.

In constructing a saw on my plan, I form the cutting-teeth in the usual manner, as represented by A, there being preferably two of these placed adjoining each other, and bevelled on opposite sides, as represented in the drawings. I then form the clearing and gauging-teeth, as represented by B, these being, at their point, of a hook-form, as shown at $c$, and in their rear there being a plain horizontal face, $e$, to act as a gauge, the hook-points $c$ being inclined from their point backward for about one-fourth of the entire width of the tooth B, so as to form a shoulder at each end of the horizontal face of the gauge $e$. Between the teeth A and B a large circular opening or space is left, as represented by C of the drawings.

When thus constructed, the teeth A, which protrude slightly beyond the others, cut the wood, and, as the points $c$ follow, they gather up the particles cut by the teeth A, and remove them, causing them to roll up into the space C, by which means the particles of saw-dust or wood are removed out of the way of the cutting-teeth A that follow, each pair of the cutting-teeth thus having a fresh and clear surface of solid wood to cut on, the solid face $e$ of the teeth B at the same time serving as a gauge to regulate the depth of the cut, and prevent the hooked points $c$ from digging into the wood, as they would otherwise be inclined to, from their peculiar shape. It will be seen that the chip which is cut by the teeth A is split off, as it were, by the points $c$, which operate like a chisel or plane in that respect. By these means I construct a saw that cuts with unusual rapidity and ease.

Having thus described my invention, what I claim, is—

As an improvement in the construction of saws, providing them with the gauging and clearing-teeth B consisting of the inclined points $c$, and the horizontal face or bearing $e$, with a shoulder between the point and the bearing $e$, substantially as shown and described.

E. M. BOYNTON.

Witnesses:
P. R. L. PEIRCE,
A. L. CHUBB.